Aug. 17, 1943.  B. SHMURAK  2,326,806
METHOD OF ATTACHING KEYS TO CAN ENDS
Filed Nov. 28, 1941
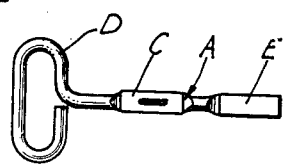
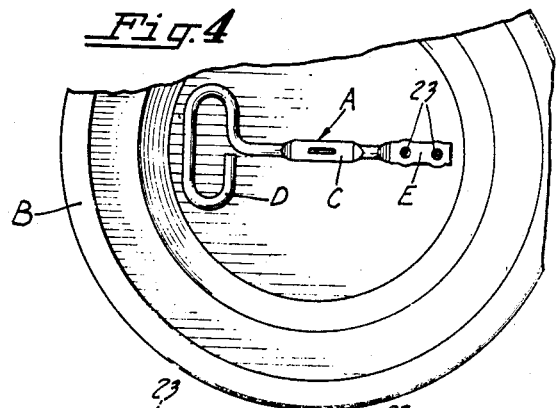
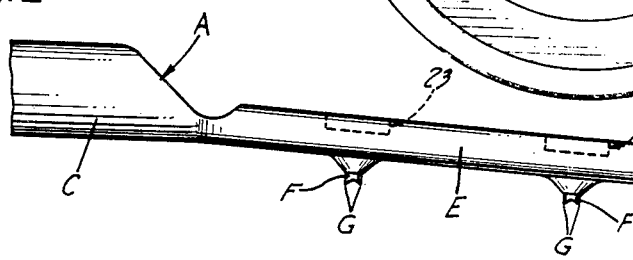
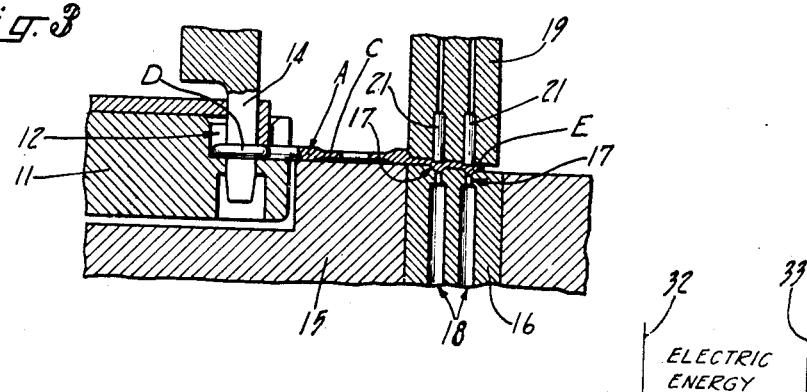
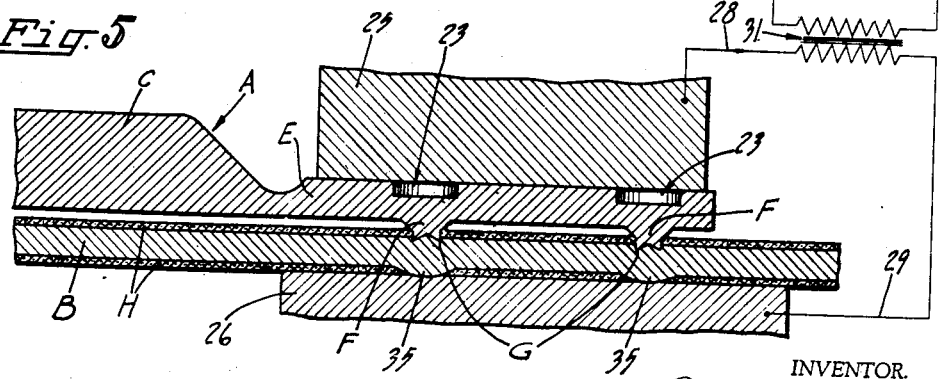
INVENTOR.
Benjamin Shmurak
BY Ivan D. Thornburgh
Charles H. Orne
ATTORNEYS Patented Aug. 17, 1943

2,326,806

UNITED STATES PATENT OFFICE 2,326,806

METHOD OF ATTACHING KEYS TO CAN ENDS

Benjamin Shmurak, New York, N. Y., assignor to American Can Company, New York, N. Y., a corporation of New Jersey Application November 28, 1941, Serial No. 420,888

6 Claims. (Cl. 219—10)

The present invention relates to a method of attaching tearing strip keys to can ends and has particular reference to welding keys to sheet metal can ends which have both surfaces lacquered or otherwise coated with a protective substance. My copending application Serial No. 420,887, filed concurrently herewith, is related to the present invention.

In the usual practice of welding keys to can ends, the assembled key and can end are positioned between electrodes and a high amperage welding current is passed through the key and the can end, and a part of the metal thereof within the path of the current is fused to form the welding bond. When it is attempted to weld, in this manner, a key to a can end which is surface coated on both sides, the coating acts as insulation and prevents the transfer of the electric current through the can end and thus prevents the proper welding of the key to the can end.

The instant invention contemplates overcoming this difficulty by providing a method of removing sufficient of the coating on both sides of the can end during the key attaching operation so that electric current may pass freely through the can end to form a welding bond.

An object, therefore, of the invention is the provision of a method of attaching opening keys to sheet metal can ends wherein the key during the attaching operation is pressed against the can end with sufficient force to displace the coating on both sides of the can end and to expose the metal surfaces to permit the passage of electric current therethrough to effect a welding bond between the key and the can end.

Another object is the provision of such a method of welding keys to can ends wherein the key is formed with a sharp projection which when clamped by the welding electrodes against the can end, indents the can end and removes sufficient of the coating on both sides of the end to permit the welding current to be readily transmitted through the end to weld the key thereto.

Numerous other objects and advantages of the invention will be apparent as it is better understood from the following description, which, taken in connection with the accompanying drawing, discloses a preferred embodiment thereof.

Referring to the drawing:

Figure 1 is a plan view of a key to be attached to a can end in accordance with the steps of the instant method invention;

Fig. 2 is an enlarged side elevation of the end of a key which is suitable for welding to a can end, the view showing sharp projections formed on the key to facilitate the attachment of the key to the can end;

Fig. 3 is a vertical sectional view of an apparatus for forming the sharp projections on the key, with parts broken away;

Fig. 4 is a plan view of a key positioned on a can end in readiness for attachment thereto with a part broken away; and Fig. 5 is an enlarged view in vertical section taken through a key and a can end clamped between a pair of electrodes for the welding operation, with parts broken away, the view also showing a wiring diagram for the electrodes.

As a preferred embodiment of the instant invention the drawing discloses one form of opening key A (Fig. 1) which is adapted to be attached to a coated can end B (Fig. 4) in accordance with the steps of the instant method invention. The key A is formed preferably with a long shank C having at one end a loop handle D and at its opposite end a flattened end piece or tail portion E which is the part of the key that is attached to the can end. This tail is first formed with a pair of depending projections F (Fig. 2) which terminate in sharp rough teeth G.

The projections F and the teeth G on the key may be formed in any suitable manner. Fig. 3 shows one form of device for producing the projections and the teeth in one operation. This device includes a holder 11 having a recess 12 in which the loop D of the key is disposed with its shank C and flat end tail E extending horizontally. A pilot pin 14 extends down through the key loop to locate the key properly and to hold it against displacement.

The shank C and the tail of the key are supported on a bed block 15 of a die mechanism having a stationary piercing die 16 located therein. The die is disposed directed beneath the tail of the key and is formed with two cylindrical die recesses 17 which merge into clearance holes 18. Above the tail of the key, the die mechanism is provided with a vertically movable punch 19 which carries a pair of flat end piercing tools 21. These tools are located in vertical alignment with the die recesses 17 in the stationary die 16.

When a key A is in place in the die mechanism, the punch 19 moves down toward the die 16 and thus brings its piercing tools down against the tail of the key with a sharp blow. This produces a pair of depressions 23 (Figs. 2 and 4) in the key tail and forces the metal of the key directly below the depressions down into the die recesses 17. The entrance edges of the recesses are beveled, hence the metal of the key which is forced into the recesses assumes an inverted conical shape terminating in a cylindrical apex which constitutes the projections F. The cylindrical portions of the projections terminate in raw rough edges which constitute the teeth G.

After the projections F and the teeth G are formed on the key A, the latter is placed on a cam end B and the parts thus assembled then are positioned between a pair of welding electrodes for the welding operations. There is an upper electrode 25 and a lower electrode 26, as best shown in Fig. 5. The can end B, coated on both sides with a protective lacquer H represents an article on which attachment of a key by welding is most difficult as the lacquer insulates the can end from the electrodes when the can end and key are positioned therebetween.

The electrodes 25, 26 constitute parts of a suitable welding machine in which the lower electrode 26 is held stationary while the upper electrode 25 is movable under pressure toward and away from the lower electrode. These electrodes are connected by wires 28, 29 to the secondary winding of a transformer 31 in which the primary circuit wires marked 32, 33 lead from any suitable source of supply of electric welding energy.

When the upper electrode 25 moves downwardly under pressure against the positioned key A, the can end B is forced down against the lower electrode 26. This action presses the sharp teeth G of the projections F on the key down through the lacquer H on the upper surface of the can end and into the metal of the end, as shown in Fig. 5. The lower metal surface is also engaged with the lower electrode and in this manner sufficient metal to metal contact is made between the key and the can end to permit of the flow of electric welding energy from the upper electrode through the key and the can end to the lower electrode. This will be explained in more detail.

This piercing of the lacquer on the can end indents or deforms the engaged part of the end to the extent of forcing out a pair of small knobs or bosses 35 (Fig. 5) which project beyond the plane of the lower surface of the can end. During the forming of these bosses the can end is backed-up by the lower electrode 26 and the pressure exerted by the upper electrode squeezes out or displaces the lacquer on the lower surface of the can end thus leaving the apexes of the bosses free of any coating. Therefore, the electric welding energy introduced into the end will flow through the lower electrode.

In this manner when sufficient lacquer has been displaced on both sides of the coated can end, electric energy from the transformer 31 is immediately transmitted along the lead wire 28, upper electrode 25, through the key and the can end to the lower electrode 26, and returns to the transformer by way of the lead wire 29. This electric energy, passing between the electrodes and through the key and can end, fuses the contacting metal and thus welds the key to the can end in a permanent bond. This completes the attaching of the key to the can end.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. The method of attaching metal opening keys to sheet metal can ends which are coated on both sides, which consists in arranging a key having a sharp projection onto a can end, pressing the projection of the key into the can end to deflect a localized portion of the end out of its plane by the pressure of such projection, so as to remove a coincidentally localized spot of coating from each side of the can end so that the key will directly engage the metal of the end at such deflected portion, and then welding the key to the can end by passing an electric current through the engaged metal parts of the key and end.

2. The method of attaching metal opening keys to sheet metal can ends having a protective surface coating on both sides thereof, which consists in arranging a key having a sharp projection onto a can end, pressing the projection of the key into the can end to pierce the coating on one side thereof to produce a metal to metal contact between the key and the can end and at the same time to extrude a boss on the opposite side of the can end while displacing the coating from the boss to provide a direct metal path through the key and the can end for the passage of an electric welding current, and welding the key to the can end by effecting such a welding current passage.

3. The method of attaching metal opening keys to sheet metal can ends having a protective surface coating on both sides, which consists in providing a key to be attached to a can end, extruding a plurality of sharp toothed projections on said key, arranging the key on the can end with the toothed projections in engagement with a coated surface of the can end, pressing the projections of the key into the can end to pierce the coating on one side thereof to produce a metal to metal contact between the key and the can end while at the same time extruding a boss on the opposite side of the can end, the formation of which displaces the coating from the boss and produces a direct metal path through the key and through the can end for the passage of an electric welding current, and passing such a welding current through said metal path to weld the key to the can end.

4. The method of attaching metal opening keys to sheet metal can ends having a protective surface coating on both sides, which consists in providing a key to be attached to a can end, forming on the key a projection having sharp teeth thereon, arranging the key on the can end with the sharp projection in engagement with a coated surface of the can end, pressing the projection of the key into the can end to pierce the coating on one side thereof to produce a metal to metal contact between the key and the can end while at the same time extruding a boss on the opposite side of the can end, the formation of which displaces the coating from the boss and produces a direct metal path through the key and through the can end for the passage of an electric welding current, and passing such a welding current through said metal path to weld the key to the can end.

5. The method of attaching metal opening keys to sheet metal can ends which are coated on both sides, which consists in arranging a key having a sharp projection onto a can end, pressing the projection of the key into the can end to pierce the coating on one side of the end and to deform the opposite side of the end to locally remove the coating therefrom, so that the key will directly engage the metal of the can end at the said pierced and deformed localities, and then welding the key to the can end by passing an electric current through the engaged metal parts of the key and end at said localities.

6. The method of electrically welding a metal opening key to a metal can end surface coated on the key contacting side with an insulating material such as lacquer, which method comprises providing a key having a sharp welding projection thereon, positioning said key onto a can end with said welding projection contacting said coating, positioning the assembled key and end between opposed welding electrodes, pressing the said key and end between said electrodes, thereby forcing said sharp welding projection through said can end coating and deforming the metal of said end at the pressure point, thereby producing a current conducting path between said electrodes and compressed key and end and welding the key to the can end by passing the electric current through said path.

BENJAMIN SHMURAK.